P. D. PHILLIPS.
PEANUT HARVESTER.
APPLICATION FILED APR. 21, 1916.
1,270,202.
Patented June 18, 1918.
4 SHEETS—SHEET 1.
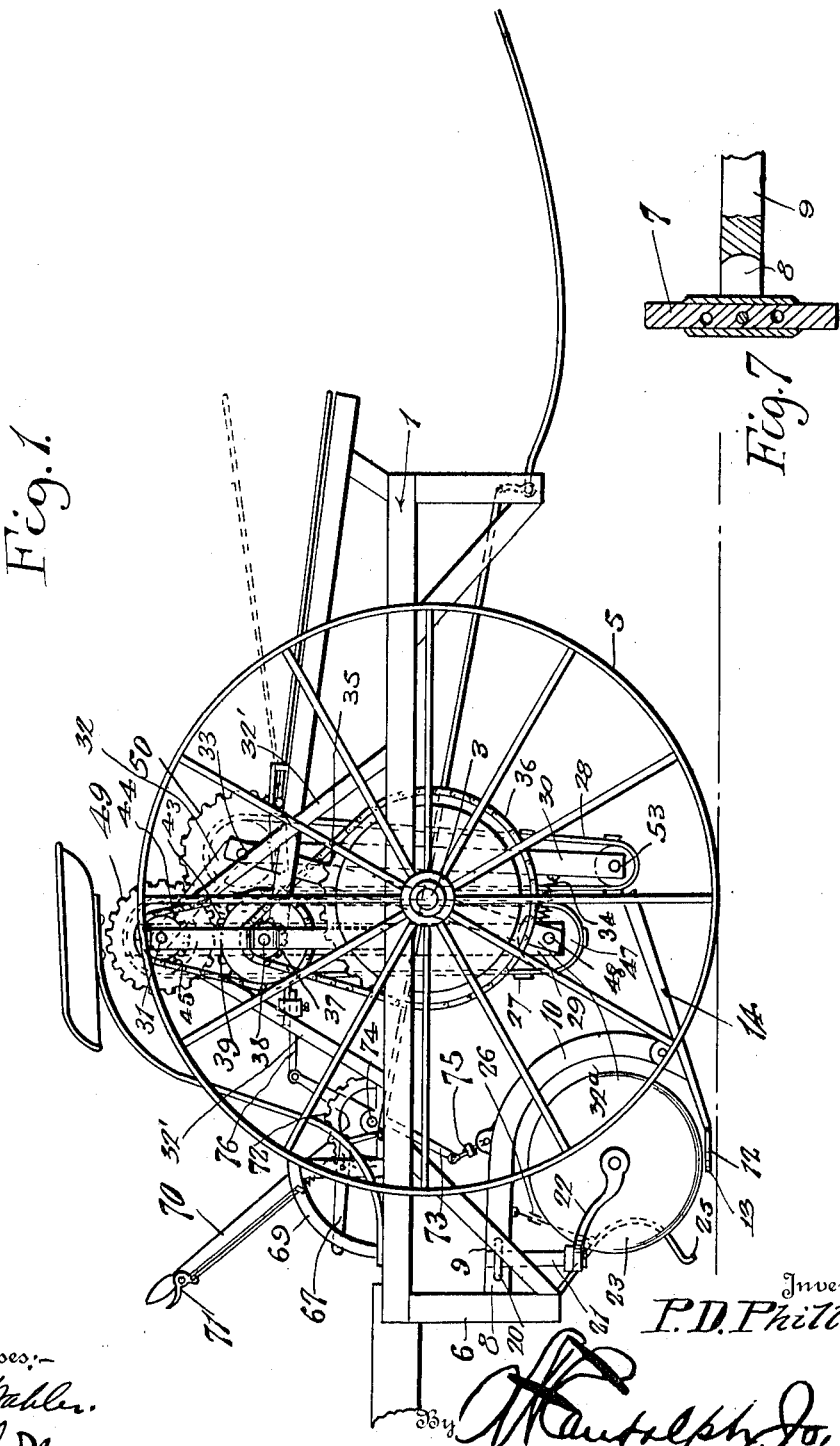

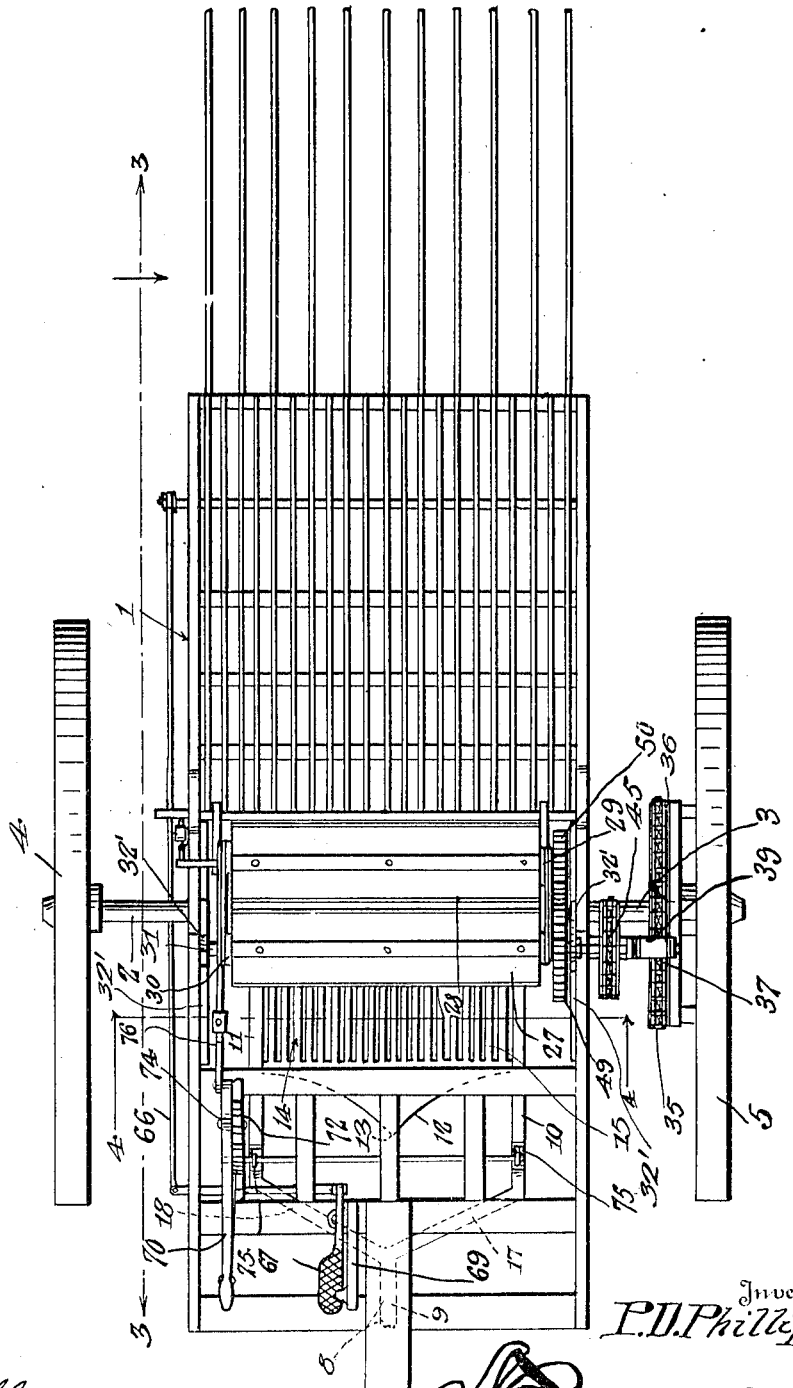

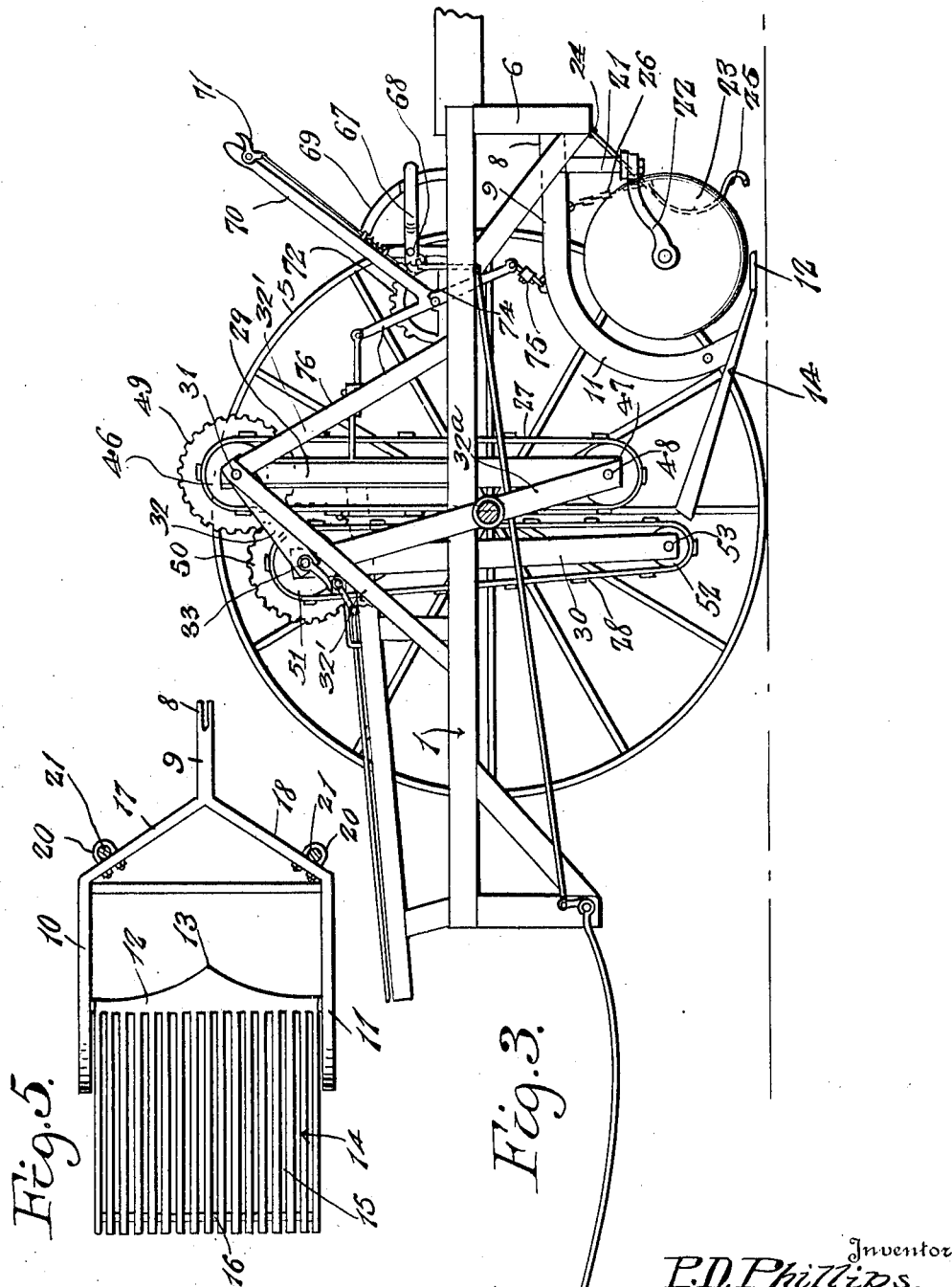

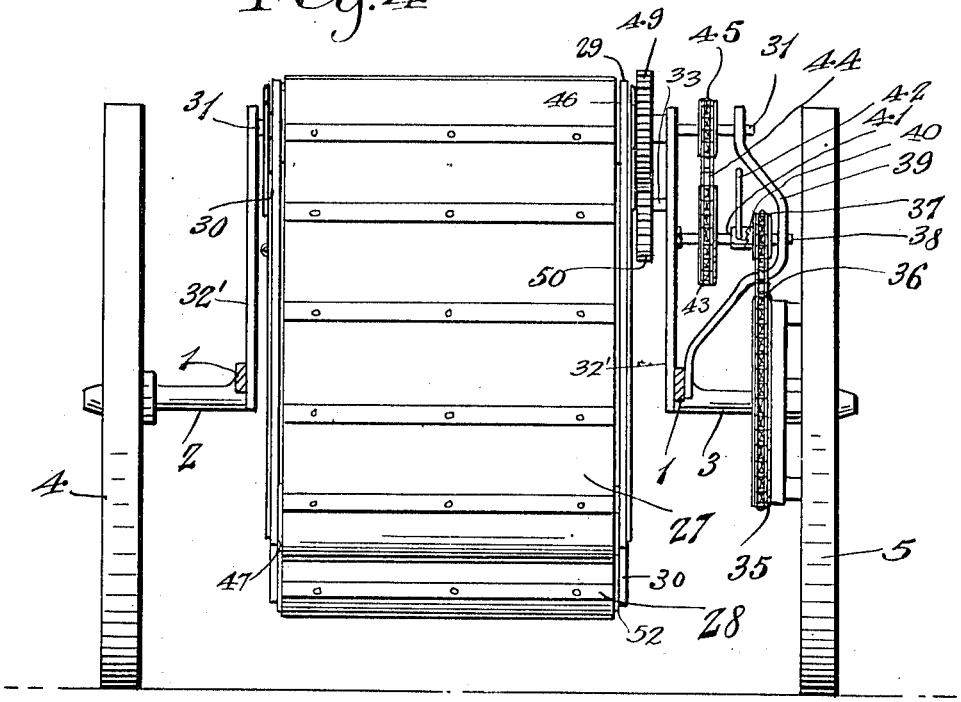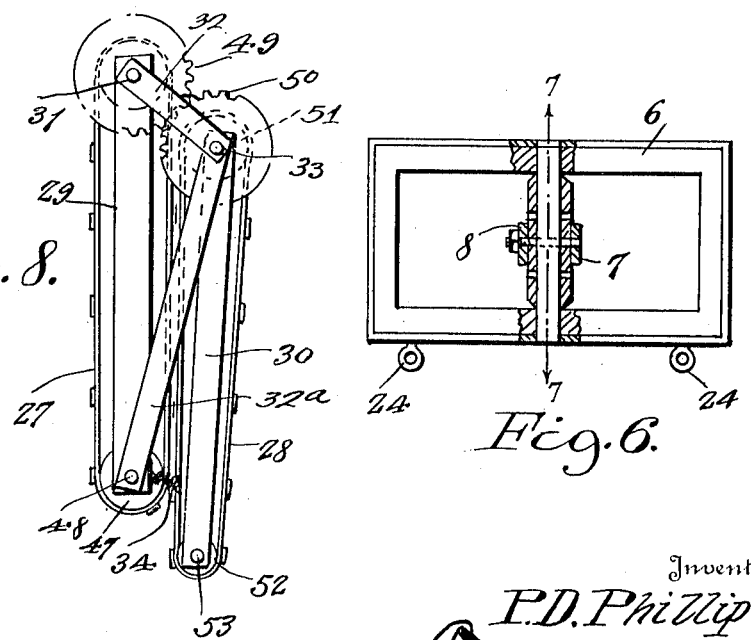

UNITED STATES PATENT OFFICE.

PRESTON D. PHILLIPS, OF BULLARD, TEXAS, ASSIGNOR OF ONE-HALF TO HERBERT L. PHILLIPS, OF WASHINGTON, DISTRICT OF COLUMBIA.

PEANUT-HARVESTER.

1,270,202.   Specification of Letters Patent.   Patented June 18, 1918.

Application filed April 21, 1916. Serial No. 92,674.

*To all whom it may concern:*

Be it known that I, PRESTON D. PHILLIPS, a citizen of the United States, residing at Bullard, in the county of Smith and State of Texas, have invented certain new and useful Improvements in Peanut-Harvesters; and I do hereby declare the following to be a full, clear, and exact description of the invention, such as will enable others skilled in the art to which it appertains to make and use the same.

This invention relates to peanut harvesting machines and the primary object of the invention is to provide a machine which will uproot or dig peanuts, and elevate them for delivery to suitable shaker and carrier structures.

Another object of this invention is to provide a peanut harvester as specified, which includes an uprooting mechanism including an uprooting plow, and a pair of colters which are adapted for rolling alongside of a row of peanuts for cutting grass and loosening up the soil alongside the row of peanuts, means for raising and lowering the digging structure into and out of an operative position and a plurality of resilient fingers for guiding the stems or plants of the peanuts for preventing them from being cut by the colters.

A further object of this invention is to provide a means for receiving the peanuts from the uprooting structure which includes a pair of substantially vertical conveyers having their facing runs traveling upwardly for elevating the peanuts and to mount these elevators upon pivotally hung frames which are connected by springs for causing the proper tension upon the peanut plants traveling between the elevators and further to provide means operatively connecting the elevator and the uprooting structure to a hand lever so that the elevator will be adjusted in unison with the adjustment of the uprooting structure.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of the improved peanut harvester.

Fig. 2 is a top plan view of the peanut harvester.

Fig. 3 is a longitudinal section through the peanut harvester on the line 3—3 of Fig. 2 showing the harvester in a reversed position.

Fig. 4 is a section on the line 4—4 of Fig. 2.

Fig. 5 is a reduced plan view of the uprooting structure.

Fig. 6 is a detail section of a part of the frame of the harvester.

Fig. 7 is a section on the line 7—7 of Fig. 6, and

Fig. 8 is a detail side elevation of the manner of hanging the vertical conveyer or elevator.

Referring more particularly to the drawings, 1 designates the supporting frame of the peanut harvester as an entirety, which supporting frame has axles 2 and 3 connected thereto upon the spindle ends of which are mounted supporting wheels 4 and 5.

The forward end of the supporting frame 1 has an auxiliary frame 6 attached thereto and depending therefrom which frame has a standard 7 positioned centrally therein and extending vertically through the frame to which the forward end 8 of an uprooting plow carrying beam 9 is adjustably connected. The beam 9 is divided into spaced beams 10 and 11 which extend rearwardly and curve downwardly in spaced relation to each other as clearly shown in Fig. 5 of the drawings. The forward end 8 of the beam 9 is pivotally connected to the standard 7. If it is so desired, a pair of forwardly extending beams may be provided, each of which would be connected to a draw head structure carried by the auxiliary frame 6. The beams 10 and 11 have an uprooting blade 12 connected to their lower ends, which uprooting blade has its forward end provided with a central point 13 from which the forward edge curves in both directions as clearly shown in Fig. 5 of the drawings.

A carrier generically indicated by the numeral 14 is also carried by the beams 10 and 11 and comprises a plurality of spaced slats 15 which are carried by a framework 16, and upon which peanuts are deposited, immediately after they have been uprooted by the uprooting plow or blade 12.

The angled portions 17 and 18 of the beams 10 and 11 which connect these beams to the main body 9 of the beam have clamps 20 attached thereto adjacent their outer ends, which clamps connect rods 21 to the beam structure. The rods 21 have brackets 22 swivelly connected to their lower ends which brackets support colter wheels 23. The colter wheels 23 are provided for cutting the ground or soil upon each side of a row of peanuts which is being uprooted.

The auxiliary frame 6 has eye-bolts 24 connected thereto, to which resilient guiding fingers 25 are connected. The fingers 25 are constructed of resilient sheet metal, and they are curved as clearly shown in the drawings for guiding the peanut vines inwardly and preventing them from being cut by the colter 23 and also guiding the vines so that they will properly pass over the carrier 14. Flexible members such as chains or the like 26 are connected to the top or vine guiding fingers 25 and to the beams 10 and 11 for raising and lowering the fingers with the movement of the beams.

The peanut plants after having been uprooted travel rearwardly over the carrier 14, which movement is caused by the travel of the harvester and are delivered to vertical elevators 27 and 28. The elevators 27 and 28 are carried by suitable supporting frames 29 and 30 respectively. The frame 29 is hung upon a shaft 31 which extends transversely across the harvester and is rotatably supported by suitable standards 32, which are connected to the framework 1 of the harvester. The frame 29 has an extension 32 formed thereon which rotatably supports the shaft 33 upon which the frame 30 is hung. Suitable bracing bars 32ª are connected to the extensions 32 and the shaft 33 and extend downwardly therefrom to the lower end of the frame 29. The lower end of the frame 30 is connected to the frame 29 by spiral springs 34 which are provided for holding the frames 29 and 30 and consequently the elevators 27 and 28 the proper distance from each other for properly engaging and elevating peanut plants.

The supporting wheel 5 has a sprocket 35 attached thereto in any suitable manner for rotation with the supporting wheel. A sprocket chain 36 travels about the sprocket 35 and about a sprocket 37 which is mounted upon a shaft 38. The shaft 38 is rotatably supported by a bracket 39 which is connected to the shaft 31 and the supporting frame 1 as shown in Fig. 4 of the drawings.

The sprocket 37 is loosely mounted upon the shaft 38 and has a clutch section 40 formed upon one side of the hub of the same which is adapted for coaction with a clutch section 41 which is feathered upon the shaft 38 and the movement of which is controlled by a lever 42 for moving the same into or out of engagement with the clutch segment 40 for rotating the shaft 38 with the rotation of the sprocket 37. The shaft 38 has a sprocket 43 mounted thereon about which a sprocket chain 44 travels. The sprocket chain 44 travels about a sprocket 45 mounted upon the shaft 31, for rotating the shaft 31 by the rotation of the supporting wheel 5 through the medium of the shaft 38.

The shaft 31 has a roller 46 mounted thereon which propels the conveyer or elevator 27. The conveyer 27 passes about a roller 47 carried by a shaft 48 which shaft is in turn supported by the lower end of the hanging frame 29. The shaft 31 has a gear 49 mounted thereon which meshes with the gear 50 mounted upon the shaft 33, for rotating the shaft 33 by the rotation of the shaft 31. A roller 51 is mounted upon the shaft 33 and is provided for propelling the conveyer 28 which conveyer travels about the roller 51 and a roller 52 which is mounted upon a shaft 53. The shaft 53 is carried by the lower end of the frame 30. The facing runs of the conveyers 27 and 28 travel upwardly for carrying the peanut plants upwardly therebetween and depositing them upon a suitable conveyer structure.

A hand lever 70 is pivotally carried by the supporting frame 1 and it has a dog mechanism 71 associated therewith for coaction with a quadrant 72. The lower end of the lever 70 has a bar 73 connected thereto which extends upwardly and downwardly from the pivotal point 74 of the lever. The lower end of the bar 73 is connected to an adjustable link 75, which link is in turn connected to the beam 11 for raising the uprooting blades 12 out of an uprooting position when desired, and also for adjusting the elevation of the blade as necessary. The upper end of the rod 73 is connected to an adjustable link or rod 76 which is in turn connected to the supporting frame 29, so that when the lever 70 is operated for either raising or lowering the beams 10 and 11 and the uprooting structure, the conveyers 27 and 28 will be moved at the same time for moving them out of the way of the carrier 14 when the uprooting structure is raised into an inoperative position and for moving them into operative relation with the carrier 14 when the uprooting structure is lowered into an operative position.

In the operation of the improved peanut harvester; when it is desired to harvest peanuts, the uprooting structure is lowered to the desired elevation so that it will uproot the peanuts. The colters 23 are carried by the uprooting structure supporting means and are therefore moved into and out of operation with the movement of the blade 12. If it be desired the colters may be removed from connection with the supporting beam, when conditions do not necessitate their use. The guiding fingers 25 will also move with the movement of the uprooting structure owing to the fact that they are connected to the beams 10 and 11 by the flexible members 26. The fingers 25 will guide the vines or tops of the peanut plants between the colters 23 and properly space them so that they will pass between the beams 10 and 11 upon the carrier 14. The forward travel of the harvester will force the peanuts and vines upwardly over the carrier 14 to the rear end of the same at which point the vines will be engaged by the elevators 28 and 27, which will carry them upwardly and deposit them upon a suitable conveyer.

From the foregoing description taken in connection with the accompanying drawings the advantages of construction and of the method of operation of the improved peanut harvester will be readily apparent to those skilled in the art to which this invention appertains, and while in the foregoing description the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a peanut harvester, the combination of an uprooting blade, a carrier carried by said blade for receiving plants therefrom, a pair of pivotally hung vertical elevators for receiving plants from said carrier, a hand lever, and means connecting said hand lever to said uprooting blade and said elevators for moving said elevators upon movement of said blade and carrier for positioning them in proper relation to the carrier.

2. In a peanut harvester, the combination, of a supporting frame, a beam pivotally connected to said supporting frame, an uprooting blade carried by said beam, a carrier connected to said blade for receiving uprooted plants therefrom, a pair of pivotally hung vertical elevators for receiving plants from said carrier, a hand lever, and means connecting said hand lever to said beam and said elevators for moving said elevators upon movement of said beams and said uprooting blade, and carrier for positioning the elevators in proper relation to the carrier.

3. In a peanut harvester, the combination of a supporting structure, a beam pivotally connected to said supporting structure, an uprooting blade connected to the lower end of said beam, a carrier connected to said blade for receiving uprooted plants therefrom, a pair of pivotally hung spaced vertical elevators for receiving plants from said carrier, a hand lever, a bar connected to said hand lever, an adjustable rod connecting said bar to said uprooting blade carrying beam, an adjustable rod connecting said lever to said elevators for moving said elevators upon movement of said beams by said hand lever for positioning said elevators in proper relation to said carrier at different adjusted positions of said carrier and uprooting blade.

4. In a peanut harvester, the combination of a supporting structure, a beam pivotally connected to said supporting structure, an uprooting blade connected to the lower end of said beam, a carrier connected to said blade for receiving uprooted plants therefrom, a pair of pivotally hung spaced vertical elevators for receiving plants from said carrier, a hand lever, a bar connected to said hand lever, an adjustable rod connecting said bar to said uprooting blade carrying beam, an adjustable rod connecting said lever to said elevators for moving said elevators upon movement of said beam by said hand lever for positioning said elevators in proper relation to said carrier at different adjusted positions by said carrier and uprooting blade, and means for holding the facing runs of said elevators in proper spaced relation to each other.

5. In a peanut harvester, the combination of a supporting frame, a beam pivotally connected to said supporting frame, an uprooting blade carried by the lower free end of said beam, a plurality of colters detachably supported by said beam, and a pair of resilient vine guiding fingers supported by said supporting frame forwardly of said colters, and flexible means connecting said guiding fingers to said beam for moving the fingers synchronously with the movement of the beam.

6. In a peanut harvester, the combination of an uprooting blade, a pivotally hung elevating means for receiving plants from said uprooting blade, means for adjusting the position of said blade and for moving the elevator upon movement of the blade, for positioning the elevator in proper plant receiving relation to the blade.

7. In a peanut harvester, the combination of a pivotally mounted supporting beam, an uprooting blade carried by said beam, pivotally hung elevating means for receiving plants from said blade, means for pivotally moving said beam to adjust the position of said blade, and means connecting said beam moving means and said elevating means for moving the elevating means upon movement of the blade for positioning the elevating means in proper relation to the blade.

8. In a peanut harvester, the combination of a supporting structure, a beam pivotally connected to said supporting structure, an uprooting blade connected to the lower end of said beam, pivotally hung elevating means for receiving plants from said blade, a hand lever, a bar connected to said hand lever, an adjustable rod connected to said beam, an adjustable rod connecting said bar to said elevating means whereby said elevating means and beam will be moved in unison by said hand lever for positioning said elevating means in proper relation to said blade at different adjusted positions of the blade.

9. In a peanut harvester, the combination, of a supporting structure, a beam pivotally connected to said supporting structure, an uprooting blade connected to the lower end of said beam, a pair of pivotally hung spaced vertical elevators for receiving plants from said uprooting blade, means for moving the said elevators and beam in unison for positioning the elevators in proper plant receiving relation to said blade, and means for holding the facing runs of said elevators in spaced relation to each other.

10. In a peanut harvester, the combination, of a supporting structure, a beam pivotally connected to said supporting structure, an uprooting blade connected to the lower end of said beam, a carrier connected to said blade for receiving uprooted plants therefrom, a pair of pivotally hung spaced vertical elevators for receiving plants from said carrier, means for adjusting the position of said blade, means connecting said blade adjusting means and said elevators for moving the elevators upon movement of the uprooting blade for positioning the elevators in proper plant receiving relation to said uprooting blade and carrier, and means for yieldably holding the facing runs of said elevator in proper spaced relation to each other.

In testimony whereof I affix my signature in presence of two witnesses.

PRESTON D. PHILLIPS.

Witnesses:
A. C. Moss,
J. A. Caswell.

Copies of this patent may be obtained for five cents each, by addressing the "Commissioner of Patents, Washington, D. C."